Patented July 6, 1926.

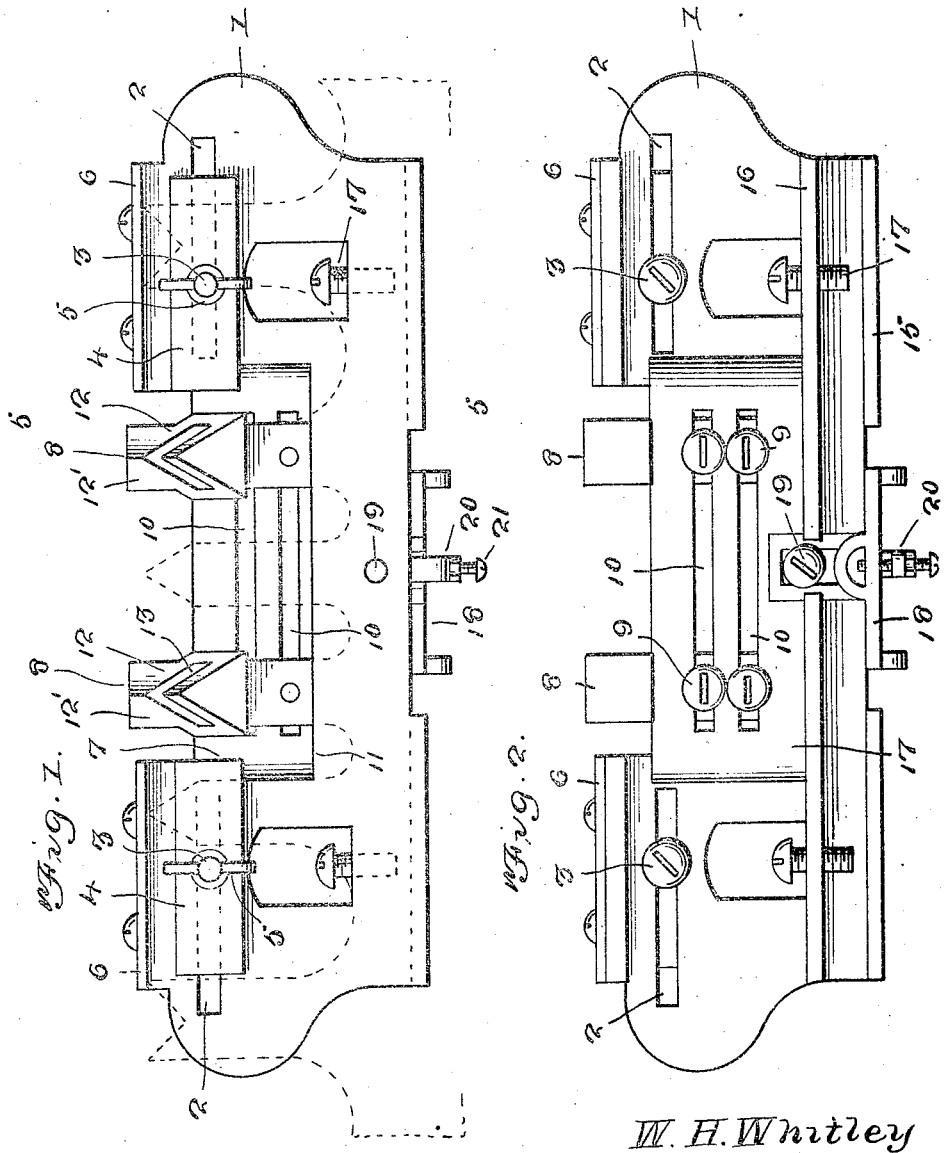

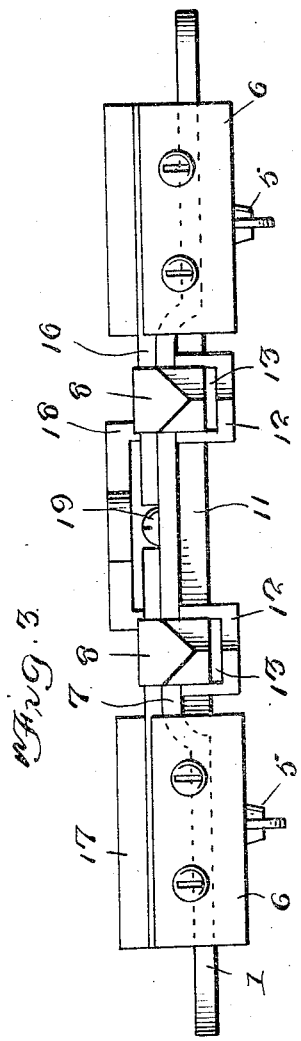

1,591,868

UNITED STATES PATENT OFFICE.

WILLIAM H. WHITLEY, OF THOMPSON FALLS, MONTANA, AND JOHN H. KIRK, OF TUCUMCARI, NEW MEXICO.

SAW-FILING DEVICE.

Application filed November 16, 1923. Serial No. 675,157.

This invention relates to a saw filing device, the general object of the invention being to provide file guides for guiding the file to give the saw tooth the proper shape, each guide being provided with a slot for receiving the tooth so that a portion of the guide is located on each face of the tooth.

Another object of the invention is to provide the device with gauging means and with file holding means.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevation of the device.

Figure 2 is a view of the opposite side thereof.

Figure 3 is a plan view.

Figure 4 is an end view.

Figure 5 is a transverse sectional view.

Figure 6 is a front view of one of the file guides.

Figure 7 is a longitudinal sectional view through Figure 6.

Figure 8 is a front view of a modified form of a file guide.

Figure 9 is a side view of another form.

Figures 10, 11 and 12 are views of a raker tooth guide.

In these views, 1 indicates a supporting member which is of the cross sectional shape shown, and which is provided with the slots 2, one adjacent each end thereof, to receive the bolts 3 which carry the plates 4 and wing nuts 5 for clamping the member to the saw. A plate 6 is fastened to the upper edge of the member, at each end thereof, these plates acting as means to gauge the teeth of a saw. The central part of the member is recessed, as at 7, to receive the file guides 8 which are adjustably held to the member by the bolts 9 which pass through the shanks of the file guides and through the slots 10 in the member. The lower ends of the shanks engage a shoulder 11 formed on the member. These file guides are each formed with a head 12, the under part of which engages the top edge of the member and the front face of which is beveled, as at 12', to form a guide for the file. If the tooth is to be rounded instead of pointed, the head must have a pair of curved surfaces, as at 12", in Figure 8. Each guide has a slot 13 therein which extends through the beveled or curved guiding surface so as to receive the saw teeth. The part of the guide which forms the slot may be detachably connected with the main part of the guide, as shown at 14, in Figure 9 so that this part can be removed to permit the guide to be used on old saws. This view shows the part 14' of channel shape in cross section with its flanges connected with the stem of the rear part by the screws 14$^x$ so that this front part 14' can be removed from the rear part, when desired. These guides may also be made of different sizes to suit the saw upon which they are used and they may have their guiding surfaces of different forms to give the tooth the shape desired. Where the teeth of the saw are of considerable width only one guide can be used on the frame but in the majority of cases two guides may be used and it will be seen that they are adjustable so that they can be set to engage two teeth of the saw.

We also form the supporting member with the flanges 15, one at each end thereof, and a rib 16, set screws 17 passing through the rib so that a file A can be placed on the flanges and held in place by the set screws when the device is to be used as a jointer. We also provide a gauge 18 which is adjustably held to the device by the set screw 19 passing through an opening 19' formed in the gauge, said gauge having an angular projection 20 which carries a set screw 21, the end of which can be seen through an arch 20' at the front of the gauge. When the raker teeth are to be trued and gauged with this device 18, the member 1 is reversed and the teeth of the saw placed against the inner face of the flanges 15, the file A having been removed. The gauge 18 is then adjusted so that its outer face is slightly below the inner faces of the flanges 15, so that the teeth of the saw will project through the gauge. The teeth are then filed to a uniform length by running the file transversely over the upper or outer face of the gauge 18 and against the tooth projecting from the gauge, so as to cut the tooth down to the level of the gauge. When the raker teeth have been thus filed it is necessary to set their edges outward longitudinally of the saw blade and this is done by swaging the extreme ends of said teeth to give the proper incline, and to determine the amount of this swaging, the gage 18 is adjusted to the position shown in Figure 2, with the parts reversed and the saw teeth engaging the flanges 15. The bracket or gauge 18 is adjusted to about the position it occupies in Figure 2 and the set screw 21 is used to gauge the height of the swaged edges of the raker teeth relative to the length of the cutting teeth. The arch enables one to see the screw and tooth. Thus this attachment or gauge 18 will act as a jointer for the raker teeth of a saw as well as a swage guide.

It is thought from the foregoing description that the advantages and novel features of the invention will be readily apparent.

We desire it to be understood that we may make changes in the construction and in the combination and arrangement of the several parts, provided that such changes fall within the scope of the appended claim.

What we claim is:—

A saw filing device comprising an elongated supporting member having slots extending longitudinally therein adjacent each end, bolts movable in said slots, clamping plates carried by said bolts, nuts on the bolts for clamping said plates in position, plates on said supporting member adjacent to said clamping plates and extending at right angles to the plane of said clamping plates, said supporting member being recessed mid-way of its ends and the wall of said recessed portion provided with parallel slots, file guides in said recessed portion, bolts carried by the file guides and movable in said slots, head members on said guides having beveled portions, and detachable members on said file guides forming slots to receive the saw teeth.

In testimony whereof we affix our signatures.

WILLIAM H. WHITLEY.
JOHN H. KIRK.